(12) United States Patent
Lagarto et al.

(10) Patent No.: US 12,440,384 B2
(45) Date of Patent: Oct. 14, 2025

(54) PATIENT INTERFACE FOR OPHTHALMIC LASER SURGERY EMPLOYING SCLERAL SUPPORT STRUCTURES TO REDUCE INTRAOCULAR PRESSURE

(71) Applicant: AMO Development, LLC, Irvine, CA (US)

(72) Inventors: Christina Lagarto, Sunnyvale, CA (US); Jose Garcia, Fremont, CA (US); Trevor Hannon, Hayward, CA (US); Vyechi Low, San Jose, CA (US)

(73) Assignee: AMO Development, LLC, Irvine, CA (US)

( * ) Notice: Subject to any disclaimer, the term of this patent is extended or adjusted under 35 U.S.C. 154(b) by 418 days.

(21) Appl. No.: 18/054,915

(22) Filed: Nov. 14, 2022

(65) Prior Publication Data

US 2023/0149217 A1 May 18, 2023

Related U.S. Application Data

(60) Provisional application No. 63/264,093, filed on Nov. 15, 2021.

(51) Int. Cl.
*A61F 9/009* (2006.01)
(52) U.S. Cl.
CPC .................................. *A61F 9/009* (2013.01)
(58) Field of Classification Search
None
See application file for complete search history.

(56) References Cited

U.S. PATENT DOCUMENTS

| | | |
|---|---|---|
| 5,108,412 A | 4/1992 | Krumeich et al. |
| 6,991,629 B1 | 1/2006 | Juhasz et al. |
| 8,623,001 B2 | 1/2014 | Preuss et al. |

(Continued)

FOREIGN PATENT DOCUMENTS

| | | |
|---|---|---|
| CN | 111920579 A | 11/2020 |
| WO | 9903433 A1 | 1/1999 |
| WO | 2019197700 A1 | 10/2019 |

*Primary Examiner* — Shirley X Jian

(57) ABSTRACT

A patient interface device for an ophthalmic surgical laser system includes a lens cone component for coupling to the laser system and a suction ring component for coupling to the patient's eye. The suction ring includes a gripper with an opening for receiving and retaining the lens cone, and a flexible skirt joined to the gripper for coupling to the eye with a vacuum force. The flexible skirt includes a circular inner edge and a circular outer edge for contacting the eye surface, and a plurality of circumferentially distributed scleral support protrusions protruding from a circumferential side wall. The end surface of the scleral support protrusions are sloped in a side cross-sectional view. The scleral support protrusions have a length to width ratio from 1.1 to 2.1, and an arc-angle ratio of the scleral support protrusions to the gaps between them is from 2.2 to 3.0. The scleral support protrusions contact the surface of the eye when the skirt is docked to the eye, which minimize intraocular pressure increase due to docking and applanation while still achieving a good vacuum seal between the suction ring and the eye. The scleral support protrusions function to prevent major deformation of the sclera when the cornea is applanated.

8 Claims, 4 Drawing Sheets

(56) References Cited

U.S. PATENT DOCUMENTS

| | | | | |
|---|---|---|---|---|
| 8,863,749 B2* | 10/2014 | Gooding | ............. | A61F 9/00812 |
| | | | | 606/4 |
| 9,636,257 B2* | 5/2017 | Gooding | ................ | A61F 9/009 |
| 9,724,238 B2 | 8/2017 | Heitel | | |
| 10,456,240 B2 | 10/2019 | Kondis et al. | | |
| 10,660,794 B2* | 5/2020 | Gooding | ................ | A61F 9/009 |
| 10,799,107 B2* | 10/2020 | Studer | .................... | A61F 9/009 |
| 10,799,394 B2 | 10/2020 | Garcia et al. | | |
| 2008/0051771 A1 | 2/2008 | Kanngiesser | | |
| 2011/0022035 A1 | 1/2011 | Porter et al. | | |
| 2011/0190741 A1* | 8/2011 | Deisinger | ............... | A61F 9/009 |
| | | | | 606/5 |
| 2013/0102895 A1* | 4/2013 | Gooding | ............. | A61F 9/00827 |
| | | | | 600/426 |
| 2013/0102922 A1* | 4/2013 | Gooding | ............. | A61F 9/00825 |
| | | | | 600/558 |
| 2013/0103009 A1* | 4/2013 | Gooding | ................ | A61B 18/20 |
| | | | | 606/4 |
| 2013/0103014 A1* | 4/2013 | Gooding | ............. | A61B 3/0008 |
| | | | | 606/4 |
| 2013/0103145 A1* | 4/2013 | John | .................... | A61F 9/0017 |
| | | | | 351/219 |
| 2017/0325997 A1 | 11/2017 | Heitel | | |
| 2020/0261265 A1 | 8/2020 | Shraiki et al. | | |

\* cited by examiner

PATIENT INTERFACE FOR OPHTHALMIC LASER SURGERY EMPLOYING SCLERAL SUPPORT STRUCTURES TO REDUCE INTRAOCULAR PRESSURE

CROSS-REFERENCE TO RELATED APPLICATIONS

This application claims the benefit under 35 U.S.C. § 119(e) of U.S. Provisional Patent Application No. 63/264,093, filed Nov. 15, 2021, which is incorporated herein by reference in its entirety.

BACKGROUND OF THE INVENTION

Field of the Invention

This invention relates to ophthalmic surgical laser systems, and in particular, it relates to patient interface devices used to stabilize the patient's eye and to deliver the laser beam to the eye during ophthalmic surgery.

Description of Related Art

Significant developments in laser technology have led to its application in the field of ophthalmic surgery, and laser surgery has become the technique of choice for ophthalmic surgical applications. Ophthalmic surgery is a precision operation and requires precise coupling between the surgical tool (i.e., the laser beam) and the region to be treated (i.e., a portion of the patient's eye). Movement of the eye with respect to the intended focal point of the laser beam can lead to non-optimal results and might result in permanent damage to tissue within the eye. Given that eye movement is often the result of autonomic reflex, techniques have been developed in an attempt to stabilize the position of a patient's eye with respect to an incident laser beam.

Mechanical stabilization devices, referred to as patient interfaces, have been developed for coupling the patient's eye to the laser system during ophthalmic laser surgeries. A patient interface typically has a component that directly contacts the eye, and engages and stabilizes the eye; meanwhile, the patient interfaces is attached to the laser system, so that the laser beam can be aligned to the eye. The patient interface functions to hold the eye still and to allow the laser beam to be delivered into the eye during the procedure. Some patient interfaces use a flexible suction ring docked on the eye, and a vacuum is drawn in a vacuum channel formed by the suction ring and the eye's surface to attach the patient interface to the eye during the treatment procedure. When the suction ring is attached to the eye, the eye is applanated by a contact lens of the patient interface. Both the process of drawing a vacuum and the applanating force on the eye is associated with an increase the patient's interocular pressure (IOP).

Mitigating the increase in IOP is desirable to prevent possible damage to the eye. Additionally, above a certain IOP threshold (which varies for each patient), the patient will experience a transient loss of vision, also known as brown-out or grey-out. Maintaining a low IOP for the longest duration possible during the treatment will help allow the patient to fixate at a fixation target to help keep the eye still, which can help in the treatment workflow.

Various patient interface designs have been described with the goal of reducing the patient's IOP increase. For example, some patient interface designs dock just to the cornea of the eye, which allows the sclera to move freely, resulting in less surface area to flatten and therefore a lower IOP. Some patient interface designs have a curved contact lens used to applanate the eye. The curved lens minimizes the amount of force needed to flatten the eye, therefore minimizing the IOP increase. In addition, some patient interface designs are not concerned with IOP increase, especially for procedures that are relatively quick.

Some known patient interface devices provide a contact or support structure inside the vacuum channel of the suction ring for various purposes. For example, U.S. patent Ser. No. 10/799,107, entitled "Ophthalmological patient interface", describes a patient interface device which includes "a negative pressure cavity with a top wall and a circumferential outer wall. . . . The patient interface further includes a number of rib members. The rib members project separately from each other from the top wall into the negative pressure cavity between the circumferential outer wall and the optical passage." (Col. 2, lines 37-46.) The ribs serve as an anti-rotation feature to "prevent[ ] relative motion, in particular relative rotation, between patient interface and patient eye." (Col. 2, lines 25-29.) The ribs are designed so that "their eye-contacting bottom surface 23a . . . are, due to the negative pressure inside the negative pressure cavity 21 and the resulting deformation of the patient eye, slightly impressed into the eye tissue, thus resulting in a 'positive locking' that prevents the patient interface from moving, in particular rotation, relative to the patient eye." (Col. 7, lines 29-35.) In another example, U.S. patent Ser. No. 10/799,394, entitled "Patient interface device for laser eye surgery having light guiding structure for illuminating eye", describes a patient interface device including a flexible or semi-flexible membrane 322 forming a space with the eye surface, and a plurality of vacuum channels 324 for applying a vacuum to this space. The "membrane 322 includes, or has formed therein, a plurality of support structures 327 configured to support membrane 322 on a sclera of patient's eye 5 when applanating lens 22 is applied to patient's eye 5." (Col. 7, lines 4-8; see FIG. 7.)

U.S. Pat. No. 9,724,238, entitled "Ophthalmic interface apparatus, method of interfacing a surgical laser with an eye, and support ring for use with a suction ring", describes a patient interface device having a suction ring 18 configured to interface with the anterior corneal surface, where a separate support ring 20 is provided in the annular cavity of the suction ring (see FIGS. 11-13, col. 12, lines 58-64). "The support ring 20 is disposed within the annular cavity 106 of the suction ring 18 and is configured to prevent buildup of intraocular pressure when the ocular stability device 10 is placed on the eyeball. In this way, the device 10 can be more easily removed from the eyeball after completion of a laser surgery procedure. With additional reference to FIGS. 12 and 13, the support ring 20 is formed from flexible material, such as a plastic and the like, and has an annular groove 128, a plurality of exterior vacuum channels 130, a relatively wide contact end surface 132." (Col. 13, lines 47-56.)

SUMMARY

There remains a need for a suction ring structure for a patient interface that effectively reduces IOP increase in patient's eyes and is also easy to manufacture.

Embodiments of the present invention provide a patient interface device in which the flexible suction ring includes scleral support features with optimized geometry. The scleral support features contact the surface of the eye when the skirt is docked to the eye, which minimize IOP increase due to docking and applanation while still achieving a good vacuum seal between the suction ring and the eye. The scleral support features function to prevent major deformation of the sclera when the cornea is applanated.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a patient interface device for coupling a patient's eye to an ophthalmic surgical laser system, which includes: a lens cone configured to be coupled to the ophthalmic surgical laser system; and a suction ring configured to be coupled to the patient's eye, the suction ring including a gripper defining a circular receiving opening and a ring shaped flexible skirt joined to the gripper and concentric with the receiving opening, wherein the gripper is configured to receive and retain a portion of the lens cone in the circular receiving opening, wherein the flexible skirt is configured to be coupled to the patient's eye, and includes: a circular inner edge, and a circular outer edge, both extending downwardly and are configured to contact a surface of the eye; a circumferential side wall between the inner edge and the outer edge; and a plurality of first scleral support protrusions protruding from the side wall inwardly and downwardly, the first scleral support protrusions being distributed circumferentially with gaps between adjacent first scleral support protrusions, wherein an end surface of each first scleral support protrusion is sloped and curved in a side cross-sectional view, wherein for the end surface of each first scleral support protrusion, a ratio of a length along a circumferential direction to a width along a direction perpendicular to the circumferential direction is between 1.1 and 2.1, and wherein a ratio of an arc angle of each first scleral support protrusion to an arc angle of the gap between the first scleral support protrusion and a neighboring first scleral support protrusion is between 1 and 4.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
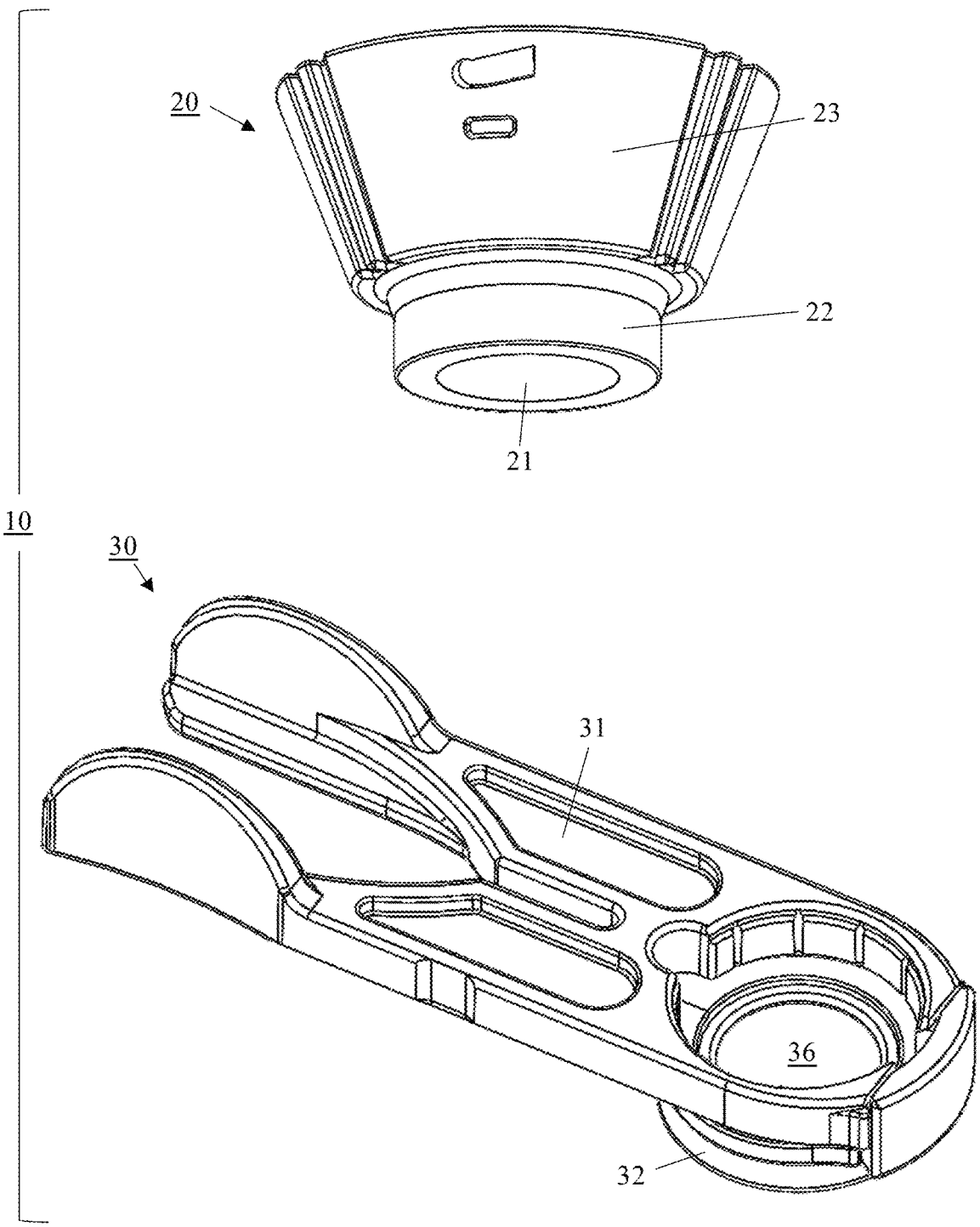
FIG. 1 schematically illustrates a patient interface device including a lens cone component and a suction ring component according to an embodiment of the present invention.
Figure 2:
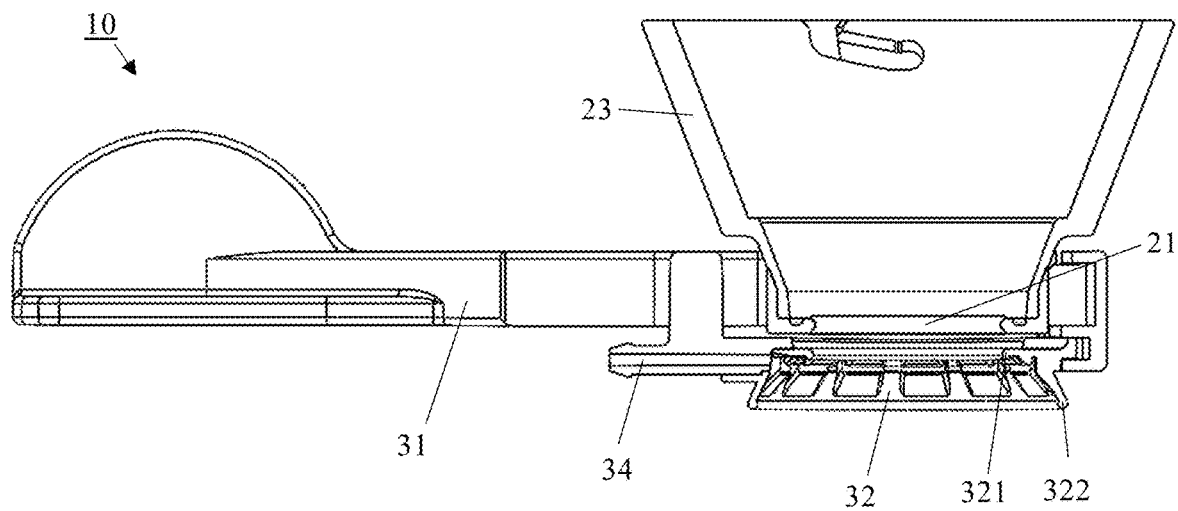
FIG. 2 schematically illustrates a cut-away view of the patient interface device of FIG. 1 with the lens cone and the suction ring joined together.
Figure 3:
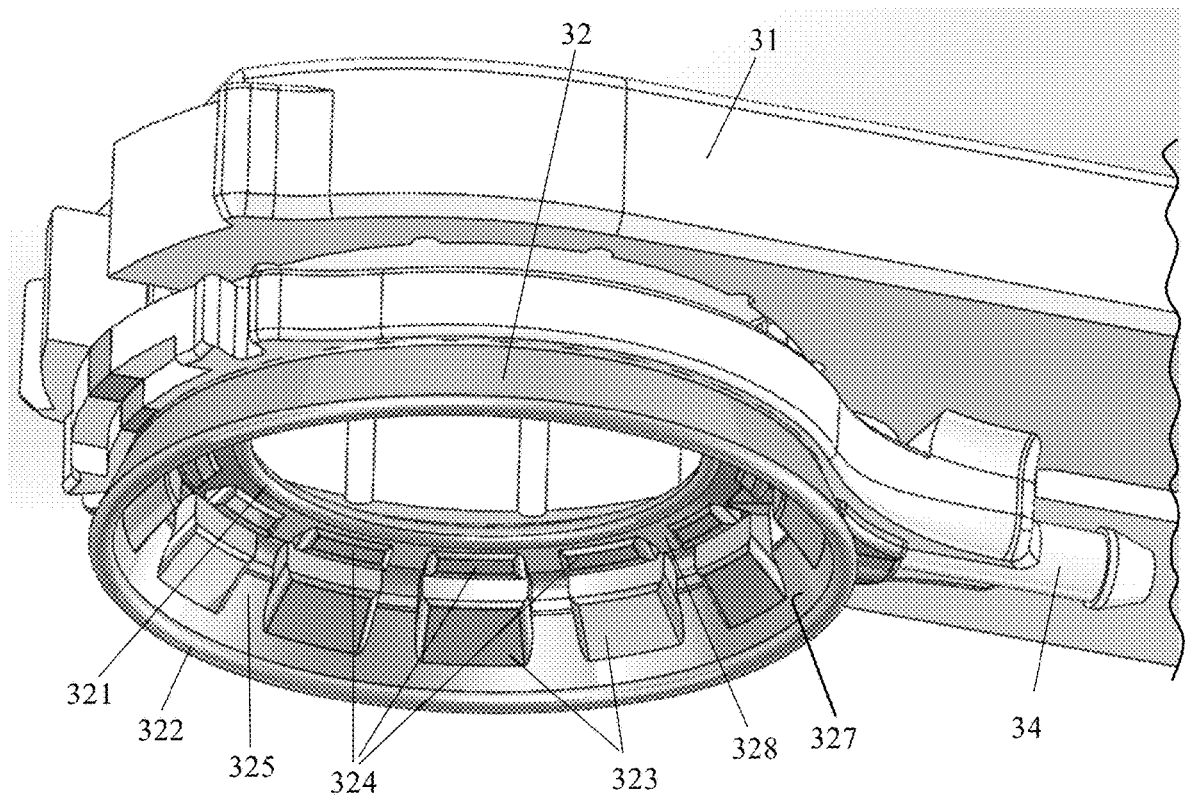
FIGS. 3, 4, 5 and 6 schematically illustrate two bottom perspective views, a side cut-away view, and a bottom plan view, respectively, of the suction ring component of the patient interface device of FIGS. 1 and 2.
Figure 4:
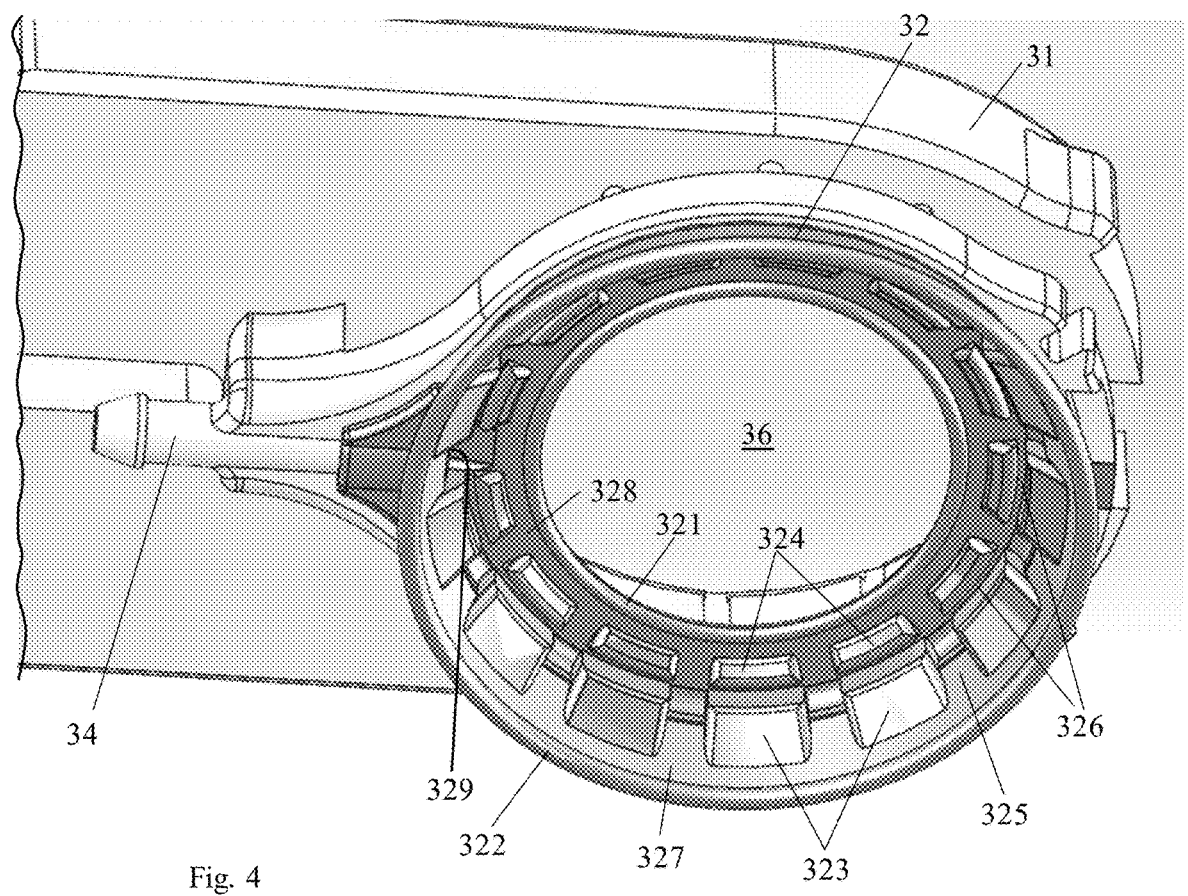
Figure 5:
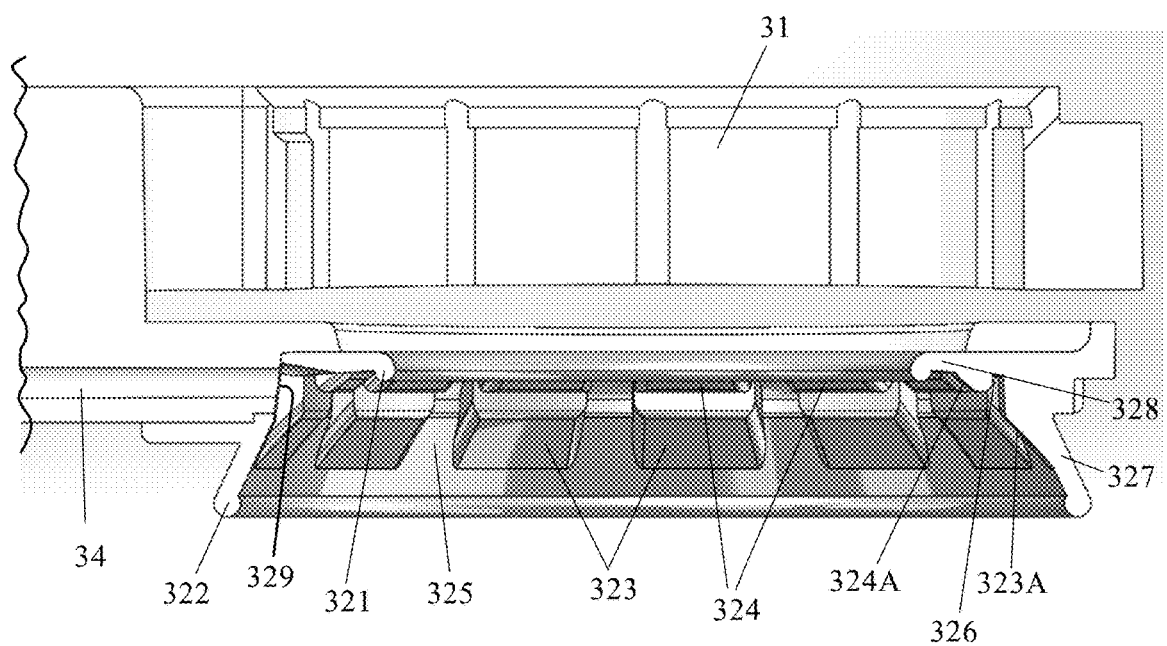

Embodiments of the present invention provide a patient interface device used to stabilize the patient's eye and to deliver the laser beam to the eye during ophthalmic surgeries. As illustrated in FIGS. 1 and 2, the patient interface device 10 includes a lens cone 20 having an applanation lens 21, and a suction ring 30 which includes a gripper 31 and a ring-shaped flexible skirt 32 joined to the gripper. The lens cone 20 has a generally frustoconical shaped shell 23 configured to be attached to a laser delivery head of the laser system (not shown) during surgery. The suction ring 30 is configured to be coupled to the patient's eye, via the flexible skirt 32, by a vacuum force applied to a ring-shaped vacuum channel formed by the flexible skirt and the eye's surface.

The gripper 31 of the suction ring 30 is constructed like a clip or clothes pin, forming a circular receiving opening 36 which is concentric with the flexible skirt 32. The gripper 31 is configured to receive a base portion 22 of the lens cone 20 in the receiving opening and retain it by a clamping force. The applanation lens 21 is located near the bottom end of the base portion 22 of the lens cone 20, and contacts the patient's eye when the suction ring 30 is coupled to the eye and the lens cone base portion 22 is inserted into and retained by the gripper 31. Thus, when the lens cone 20 is coupled to the laser delivery head, the flexible skirt 32 is coupled to the eye, and the base portion 22 of the lens cone 20 is retained in the receiving opening 36 of the gripper 31, the eye is coupled to the laser system and the treatment procedure can be performed.

Note that in the illustrated embodiment, the lens cone 20 and the suction ring 30 are two separate pieces, but the invention is not limited to such a configuration; the lens cone 20 and the suction ring 30 may alternatively be integrated into one piece.

FIGS. 3-6 show details of the skirt 32 of the suction ring 30 with a portion of the gripper 31. The flexible skirt 32 defines an circular inner (upper) edge 321 and an circular outer (lower) edge 322, both of which extend downwardly (toward the eye) and are configured to contact the surface of the eye. The circular inner edge 321 is located higher than the circular outer edge 322 to better conform to the approximately spherical shape of the surface of the eye. When the flexible skirt is placed on the eye and both edges contact the surface of the eye, a circular, ring-shaped sealed space is formed between the flexible skirt 32 and the surface of the eye. A vacuum port 34 is connected to the flexible skirt 32, and is open to the interior of the flexible skirt 32 at an opening 329 between the inner and circular outer edges 321 and 322, to apply a vacuum to the ring-shaped sealed space.

A plurality of first scleral support protrusions 323 and second scleral support protrusions 324 are provided in the flexible skirt 32. The first scleral support protrusions protrude from a circumferential side wall 327 of the flexible skirt 32 both inwardly (toward the central axis of the ring) and downwardly. The second scleral support protrusions 324 are located closer to the inner edge 321 and protrude downwardly from the circumferential top wall 328 of the flexible skirt 32.

The first scleral support protrusions 323 are arranged circumferentially around the ring shape of the flexible skirt 32, preferably evenly distributed, with gaps 325 between adjacent protrusions. The second scleral support protrusions 324 are also arranged circumferentially around the ring shape of the flexible skirt 32 and are aligned radially with the first scleral support protrusions 323. Each second scleral support protrusion 324 and the corresponding first scleral support protrusion 323 are separated in the radial direction by a gap 326. Preferably, all first scleral support protrusions 323 have the same shape and size and all second scleral support protrusions 324 have the same shape and size. The end surface 323A of each first scleral support protrusion and the end surface 324A of each second scleral support protrusion are sloped and slightly curved in the side cross-sectional view (see FIG. 5). Preferably, the end surfaces 323A and 324A lie on the same near-spherical surface which is designed to fit the curvature of an average eye. In the bottom plan view (see FIG. 6), the shape of each end surface 323A and 324A is a segment of a ring.

Figure 6:
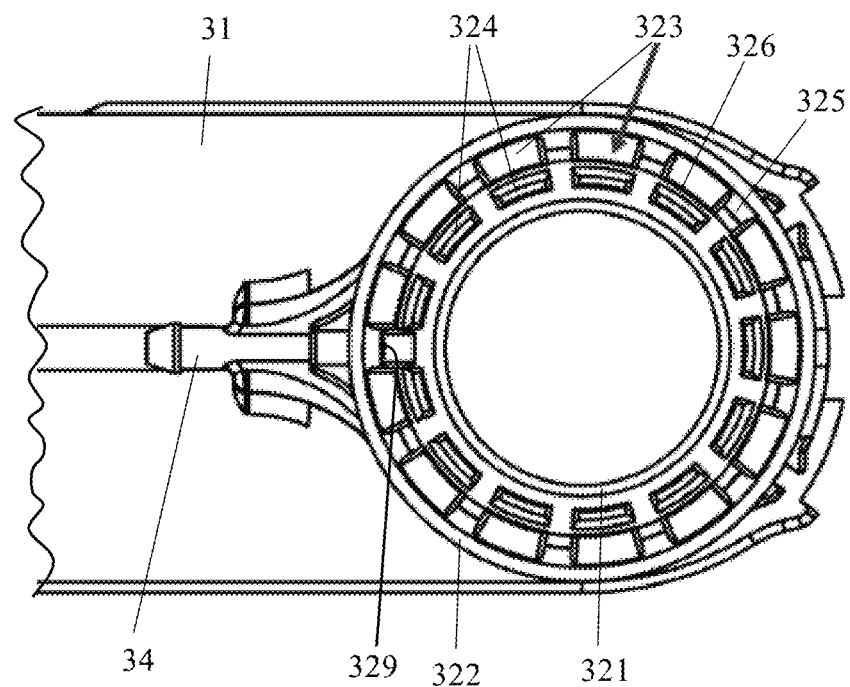
Figure 7:
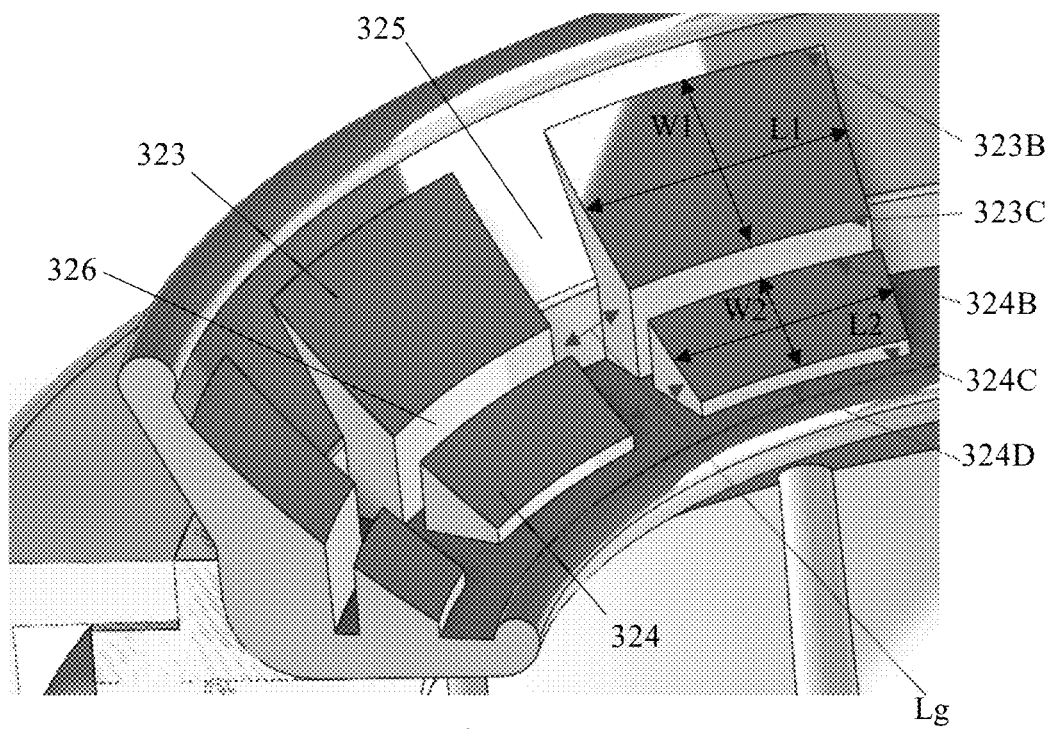
FIG. 7 schematically illustrates a cut-away view showing details of the suction ring component of the patient interface device of FIGS. 1 and 2.

The dimensions of the first and second scleral support protrusions 323 and 324, according to one particular embodiment, are described below with reference to FIGS. 6 and 7. In this embodiment, there are thirteen evenly distributed first scleral support protrusions 323 and thirteen evenly distributed second scleral support protrusions 324. In the bottom plan view (see FIG. 6), the arc angle of each first and second scleral support protrusion 323 and 324 is approximately 20 degrees, and the arc angle of each gap 325 is approximately Lg=7.69 degrees. The arc length of each first and second scleral support protrusion 323 and 324 (measured at the center between the two edges 323B and 323C, and between the two edges 324B and 324C, respectively) is approximately L1=3.24 mm and L2=2.74 mm, respectively. The arc length of each gap 325 is approximately 0.99 mm at the inner end and 1.34 mm at the outer end. The width of the sloped end surfaces 323A and 324A (in the direction approximately parallel to the sloped surface and perpendicular to the circumferential direction, i.e. the distance between the edges 323B and 323C, and between the edges 324B and 324C, respectively) is approximately W1=2.00 mm and W2=1.10 mm, respectively. The width in the radial direction of each second scleral support protrusion 324 is approximately 0.892 mm. The width (in the radial direction) of the gap 326 between each pair of first and second scleral support protrusions 323 and 324 is approximately 0.266 mm.

Although specific examples are given above, the invention is not limited to these examples. Other numbers and sizes of the first and second scleral support protrusions may be used. More generally, there may be eleven to fifteen first scleral support protrusions and corresponding second scleral support protrusions. The arc angle of each first and second scleral support protrusion may be 5-22 degrees, and the arc angle of each gap may be between 22-5 degrees. The ratio of the arc angle of the first (or second) scleral support protrusions to the arc angle of the gaps between adjacent first (or second) scleral support protrusions may be between 0.25 and 4, more preferably, between 1 and 4. The arc length L1 and L2 of each first and second scleral support protrusion may be 0.9-3.6 mm and 0.7-3.1 mm, respectively. The arc length of each gap 325 may be 0.7-3.8 mm. The widths W1 and W2 of the sloped end surfaces of each first and second scleral support protrusion may be 1.5-2.5 mm and 0.8-1.4 mm, respectively. The radial-direction width of the gap 326 between each pair of first and second scleral support protrusions may be 0.24-0.29 mm. The ratio of the radial-direction width of the second scleral support protrusions 324 to the radial-direction width of the gap 326 may be 3.0-3.7.

Preferably, the arc lengths and the widths of the end surfaces of the first and second scleral support protrusions satisfy the following relationship: $1.1<L1/W1<2.1$, and $2.0<L2/W2<3.0$.

More generally, the design considerations for the scleral support protrusions are as follows. First, the number of protrusions (N) along circumference (360 degrees) is preferably 5 to 20. When the number N is fewer than 5, there will be too little structural variation and the holding force will be compromised. When the number N is greater than 20, each protrusions will be too small to have sufficient holding force (the force by the numerous protrusions will tend to create an even force around the circumference). In the preferred embodiment shown and described above, the number N is 13.

Second, after the number N is selected, the circumference is divided into N sectors; within each sector, the percentage of the arc angle occupied by the protrusion is preferably 20%-80% (the rest is the gap), and more preferably, 50%-80%. In the preferred embodiment shown and described above, the percentage is about 72% protruding (leaving 28% gap). In another embodiment, the percentage is 60% protruding (leaving 40% gap).

Third, the number of concentric circles of protrusions (M) is preferably 1 to 4. When the number M is greater than 4, there will be insufficient space to accommodate the protrusions. In the preferred embodiment shown and described above, the number M is 2.

These first and second scleral support protrusions 323 and 324 help to maintain the structural integrity of the sclera of the eye when the suction ring 30 is applied to the eye and vacuum is initiated. These structures help to maintain the shape of the eye globe when the suction ring is docked on the eye and ensures that the IOP increase is minimized.

The flexible skirt 32, including the first and second scleral support protrusions 323 and 324, may be formed as one piece of a soft thermoplastic elastomer (TPE) material, or other suitable flexible and compliant materials such as silicone, flexible plastic, rubber, etc., by molding. Preferably, the material has a hardness of Shore D 30-80A, which satisfies both the requirements of a sufficiently soft and flexible skirt and the requirements of a sufficiently hard scleral support structure. Preferably, the flexible skirt 32 including the first and second scleral support protrusions 323 and 324 is formed by overmolding the TPE material onto the gripper 31, which can minimize manufacturing time and error. One constraint imposed by this one-piece structure and related manufacturing method is that the gaps between the various scleral support protrusions should not be too narrow, because a narrow gap would require a corresponding thin part in the mold, which is difficult to accomplish.

It will be apparent to those skilled in the art that various modification and variations can be made in the patient interface device of the present invention without departing from the spirit or scope of the invention. Thus, it is intended that the present invention cover modifications and variations that come within the scope of the appended claims and their equivalents.

What is claimed is:

1. A patient interface device for coupling a patient's eye to an ophthalmic surgical laser system, comprising:
   a lens cone configured to be coupled to the ophthalmic surgical laser system; and
   a suction ring configured to be coupled to the patient's eye, the suction ring including a gripper defining a circular receiving opening and a ring shaped flexible skirt joined to the gripper and concentric with the circular receiving opening, wherein the gripper is configured to receive and retain a portion of the lens cone in the circular receiving opening,
   wherein the flexible skirt is configured to be coupled to the patient's eye, the flexible skirt defining an inwardly direction which points toward a central axis of the circular receiving opening and a downwardly direction which is parallel to the central axis and points toward the patient's eye, wherein the flexible skirt includes:
   a circular inner edge, and a circular outer edge, both extending downwardly and are configured to contact a surface of the eye;

a circumferential side wall between the circular inner edge and the circular outer edge; and a plurality of first scleral support protrusions protruding from the circumferential side wall inwardly and downwardly, the first scleral support protrusions being distributed circumferentially with gaps between adjacent first scleral support protrusions, wherein an end surface of each first scleral support protrusion that faces inwardly and downwardly is sloped and curved in a side cross-sectional view, wherein for the end surface of each first scleral support protrusion, a ratio of a length along a circumferential direction to a width along a direction perpendicular to the circumferential direction is between 1.1 and 2.1, and wherein a ratio of an arc angle of each first scleral support protrusion to an arc angle of the gap between the first scleral support protrusion and a neighboring first scleral support protrusion is between 1 and 4, wherein the flexible skirt is configured to form a circular, ring-shaped sealed space between the flexible skirt and the surface of the eye when the circular inner edge and the circular outer edge contact the surface of the eye.

2. The patient interface device of claim 1, wherein the plurality of first scleral support protrusions have the same size and are evenly distributed circumferentially.

3. The patient interface device of claim 2, wherein the length along the circumferential direction of each first scleral support protrusion is from 0.9 mm to 3.6 mm.

4. The patient interface device of claim 1, wherein the plurality of first scleral support protrusions include 5 to 20 first scleral support protrusions.

5. The patient interface device of claim 1, wherein the flexible skirt further comprises a circumferential top wall located between the circumferential side wall and the circular inner edge, and plurality of second scleral support protrusions being located in the sealed space above the plurality of first scleral support protrusions and protruding from the circumferential top wall downwardly, the second scleral support protrusions being distributed circumferentially and aligned radially with the plurality of first scleral support protrusions, wherein an end surface of each second scleral support protrusion that faces inwardly and downwardly is sloped and curved in a side cross-sectional view and lies on a same surface as the end surface of the corresponding first scleral support protrusion, and wherein for the end surface of each second scleral support protrusion, a ratio of a length along a circumferential direction to a width along a direction perpendicular to the circumferential direction is between 2.0 and 3.0.

6. The patient interface device of claim 5, wherein a width of a radial gap between each second scleral support protrusion and the corresponding first second scleral support protrusion is between 0.24 mm and 0.29 mm.

7. The patient interface device of claim 1, wherein the flexible skirt is formed as one piece of a flexible and compliant material.

8. The patient interface device of claim 7, wherein the flexible skirt is formed by overmolding the flexible and compliant material onto the gripper.

* * * * *